United States Patent [19]

Starzewski

[11] Patent Number: 5,326,507
[45] Date of Patent: Jul. 5, 1994

[54] MANUFACTURE OF POLARIZING FILMS

[75] Inventor: Karl-Heinz A. O. Starzewski, Bad Vilbel, Fed. Rep. of Germany

[73] Assignee: Agfa-Gevaert AG, Leverkusen

[21] Appl. No.: 38,015

[22] Filed: Mar. 29, 1993

[30] Foreign Application Priority Data

Apr. 8, 1992 [DE] Fed. Rep. of Germany ....... 4211779

[51] Int. Cl.$^5$ ............................................. B29C 55/06
[52] U.S. Cl. ........................................ 264/1.3; 264/24; 264/78; 264/108; 264/185; 264/204; 264/210.2; 264/288.4; 264/291
[58] Field of Search .................... 264/78, 1.3, 24, 108, 264/288.4, 210.2, 291, 185, 289.3, 289.6, 204, 212

[56] References Cited

U.S. PATENT DOCUMENTS

| | | |
|---|---|---|
| 2,344,117 | 3/1944 | Vierling et al. ................. 264/78 |
| 3,015,989 | 1/1962 | Delangre et al. ............... 264/78 |
| 3,254,562 | 6/1966 | Blout et al. ..................... 264/1.3 |
| 3,265,777 | 8/1966 | Marks et al. .................... 264/2 |
| 3,613,155 | 10/1971 | Bloxsom ...................... 18/1 FS |
| 3,869,533 | 3/1975 | Janocha et al. ................ 264/146 |
| 4,124,677 | 11/1978 | Saijo et al. ..................... 264/289.3 |
| 4,134,957 | 1/1979 | Yoshimura et al. ............ 264/288 |
| 4,842,781 | 6/1989 | Nishizawa et al. ............. 264/1.3 |
| 4,893,911 | 1/1990 | Ostoja-Starzewski et al. . 264/1.3 |
| 4,895,769 | 1/1990 | Land et al. ..................... 264/78 |
| 4,992,218 | 2/1991 | Sugio et al. .................... 264/1.3 |
| 5,051,286 | 9/1991 | Starzewski .................... 428/500 |
| 5,071,906 | 12/1991 | Tanaka et al. ................. 264/1.3 |
| 5,073,014 | 12/1991 | Starzewski .................... 264/1.3 |

FOREIGN PATENT DOCUMENTS

| | | | |
|---|---|---|---|
| 0374627 | 6/1990 | European Pat. Off. . | |
| 53-139678 | 12/1978 | Japan ............................ | 264/108 |
| 55-135807 | 10/1980 | Japan ............................ | 264/185 |
| 62-156602 | 7/1987 | Japan ............................ | 264/78 |
| 3-182701 | 8/1991 | Japan ............................ | 264/291 |
| 3-288803 | 12/1991 | Japan ............................ | 264/291 |

*Primary Examiner*—Jeffery Thurlow
*Attorney, Agent, or Firm*—Connolly & Hutz

[57] ABSTRACT

The process for manufacturing a polarizing film based on polyvinyl alcohol and at least one dichroic substance by casting or extrusion of a mixture of polyvinyl alcohol and a solvent, whereby the polyvinyl alcohol contains the dichroic substance, drying and stretching of the film by between 300 and 1200%, whereby, depending on the width of the unstretched film $b_o$, a stretch gap $l_o$ is provided, satisfying the condition $b_o/l_o < 3$, leads to higher dichroic extinction quotients.

8 Claims, No Drawings

MANUFACTURE OF POLARIZING FILMS

The invention relates to a process for manufacturing a polarizing film based on polyvinyl alcohol and at least one dichroic substance by the casting or extrusion of a mixture of polyvinyl alcohol and a solvent, whereby the polyvinyl alcohol contains the dichroic substance, and by drying and stretching the film by between 300 and 1200%.

It is known how to manufacture polarizing films based on polyvinyl alcohol and at least one dichroic substance. An essential characteristic of polarizing films is that transmission in the closed position is as low as possible and in the open position as high as possible. This characteristic needs to be improved further.

An appropriate measure of light/dark contrast is the dichroic extinction quotient $Q_E$. It is defined as the ratio of the extinction of linearly polarized light in the closed position to the extinction of linearly polarized light in the open position at a particular wavelength.

$$Q_E = \frac{\text{Extinction (closed)}}{\text{Extinction (open)}}$$

The higher this value, the better the polarizer.

It was found that this characteristic can be improved by a particular way of implementing the stretching process, ie that during the stretching process a sufficiently wide stretch gap has to be provided, depending on the width of the film.

The stretch gap $l_o$ represents the distance between the two points at which the film to be stretched is firmly clamped. With discontinuous stretching this value relates to the distance prior to stretching. With continuous stretching between pairs of rollers running at different speeds the stretch gap remains constant during stretching.

The film width $b_o$ is the width of the film prior to stretching.

Hence the object of the invention is the above-mentioned process, which is characterised in that during stretching a ratio $b_o/l_o$ of less than 3, but preferably less than 2, and in particular 0.1 to 1, is maintained.

Stretching is carried out between 10° and 210° C., but in particular between 80° and 200° C., and preferably between 120° and 190° C. It is known that the stretching temperature can be reduced by the addition of plasticisers.

Suitable solvents for polyvinyl alcohol are eg. water, dimethylformamide and dimethyl sulfoxide. Water is preferred.

The quantity of dichroic substance used is, in particular, from 0.01 to 10% by weight, and preferably 0.1 to 6% by weight, in relation to the polymer. The polymer-solvent mixture preferably contains 2 to 80% polymer by weight. With lower polymer content, eg. 2 to 20% by weight, the polarizing film is preferably manufactured by casting, with high polymer content, eg. 50 to 80% by weight, the polarizing film is preferably manufactured by extrusion.

Particularly suitable as dichroic substances are those, the dichroic characteristics of which are not impaired by the conditions under which the polarizing film is manufactured, in particular organic pigments and polyacetylene.

Organic pigments have been proposed many times, and a detailed list can be found in, eg, EP-A-297 927.

Polarizing films based on polyvinyl alcohol/polyacetylene are known from, eg, EP-A-249 019.

The casting of polarizing films is described in, eg, DE-OS 4 026 960 and DE-OS 40 32 590.

Removal of the solvent is effected preferably by drying in air, whereby the air has in particular a temperature of up to 60° C. Drying should continue until the polarizing film prior to stretching contains at most 25% solvent by weight, preferably at most 20% solvent by weight.

Stretching can be discontinuous or continuous, whereby continuous stretching is carried out in particular by passing the film between pairs or sets of rollers running at different speeds. The second pair of rollers to be passed through runs at a faster speed than the pair of rollers passed through first, by the factor by which the material is to be stretched. Stretching can be undertaken in one or several stages. The gap between the roller pairs must be capable of being heated, in order to heat the film to the necessary stretching temperature, by, for example, passing the film through a box with input and output slots, into which hot air is fed at the desired temperature. Feeding of air is effected normally by nozzles with slots or holes. It can take place parallel or perpendicular to the direction of the film.

As polyvinyl alcohol any polyvinyl alcohol is suitable which has, eg, been manufactured by the complete or partial saponification of polyvinyl acetate, in particular a polyvinyl alcohol in which 90 to 100% of all monomer units are vinyl alcohol units.

The remainder normally consists of monomer units such as ethylene, vinyl acetate or vinyl trifluoroacetate.

These copolymers can be present as predominantly tactic or atactic polymers. The PVAL to be used according to the invention can for example be produced by copolymerization of more than 90 to 100% vinyl acetate units with fewer than 10 to 0 ethylene units and complete saponification of all vinyl acetate units. It can however also be manufactured by polymerization of vinyl acetate or vinyl trifluoroacetate and saponification of more than 90 to 100% of all ester groups. In industrial practice PVAL is manufactured by saponification of polyvinyl acetate to the extent desired.

When using polyacetylene as dichroic substance a graft copolymer combining polyvinyl alcohol and polyacetylene, as is known, for example, from EP-A-374 627 or EP-A-384 248, is manufactured and processed into polarizing film.

EXAMPLES

Example 1

Manufacture of Copolymer Combining Polyvinyl Alcohol and Polyacetylene

Subject to the exclusion of air, 1.4 mmol [NiPh(Ph$_2$PCHCPhO)-(i-Pr$_3$PCHPh)] per 100 g polyvinyl alcohol and 5 g dry dimethyl sulfoxide was stirred into a 6% solution by weight of highly saponified polyvinyl alcohol (residual acetate content about 1%) in dry N-methylpyrrolidone at 40° C., and for 2 minutes acetylene was polymerized. The black-blue polymer was precipitated in acetone, washed thoroughly with acetone and dissolved in water, in which it amounted to about 8% by weight. The viscosity of the solution at 25° C. was about 300 mPas.

In the formula "Ph" stands for phenyl; "i-Pr" stands for isopropyl.

Example 2

Manufacture of Cast Film

Glycerine amounting to about 14% by weight in relation to the polymer was added to the aqueous solution described above, the finished casting solution was filtered and degassed and then a film was cast at 36° C. on a cellulose triacetate carrier film according to the cascade casting process. The wet layer added had a thickness of about 350 μm.

Example 3

Manufacture of the Polarizing Film

The film dried to a residual moisture of about 20% by weight with a width of 22 cm was removed from the carrier film and clamped in order to stretch it in a stretching machine in such a way that the ratio $b_o/l_o$ amounted to 3. The film was then stretched in a hot-air shaft at 170° C. to eight times its original length ($\epsilon = 700\%$).

The film had at 600 nm a transmission $T_{unpol}$ for unpolarized light of 39%, a degree of polarization P of 99% and a $Q_E$ value of 22.

Example 4

Stretching was carried out as in Example 3, but $b_o/l_o$ was fixed at a value of 2.

The degree of stretching $\epsilon$ was 700%.

At 600 nm the polarizing film now possessed better optometric values:
$T_{unpol} = 39\%$
$P = 99.96\%$
$Q_E = 35$.

Example 5

Stretching was carried out as in Example 3, but $b_o/l_o$ was fixed at 1.4.
$\epsilon = 740\%$
$T_{unpol} = 39\%$ at 600 nm
$P = 99.98\%$
$Q_E = 40$.

Example 6

Stretching was carried out as in Example 3, but $b_o/l_o$ was fixed at 1.0.
$\epsilon = 760\%$
$T_{unpol} = 39\%$ at 600 nm
$P = 99.99\%$
$Q_E = 41$.

I claim:

1. Process for manufacturing a polarizing film based on polyvinyl alcohol and at least one dichroic substance by casting or extrusion of a mixture or polyvinyl alcohol and a solvent, whereby the polyvinyl alcohol contains the dichroic substance, drying and stretching of the film at between 10° and 210° C. by 300 to 1200%, wherein, depending on the width of the unstretched film $b_o$ a stretch gap $l_o$ is provided, satisfying the condition $b_o/l_o < 3$.

2. Process according to claim 1, characterised in that $b_o/l_o$ is less than 2.

3. Process according to claim 1, characterised in that $b_o/l_o$ amounts to between 0.1 and 1.

4. Process according to claim 1, characterised in that the dichroic substance is polyacetylene.

5. Process according to claim 4, characterised in that the polyacetylene is manufactured in polyvinyl alcohol solution using a nickel catalyzed process.

6. Process according to claim 1, characterised in that stretching is carried out at temperatures between 80° and 200° C.

7. Process according to claim 1, characterised in that stretching is carried out at temperatures between 120° and 190° C.

8. Process for manufacturing a polarizing film based on polyvinyl alcohol and polyacetylene by casting or extrusion of a mixture of polyvinyl alcohol and a solvent, whereby the polyvinyl alcohol contains the polyacetylene, drying and stretching of the film at between 10° and 210° C. by 300 to 1200%, wherein, depending on the width of the unstretched film $b_o$, a stretch ga $l_o$ is provided, satisfying the condition $b_o/l_o < 3$.

* * * * *

UNITED STATES PATENT AND TRADEMARK OFFICE
CERTIFICATE OF CORRECTION

PATENT NO. : 5,326,507
DATED : July 5, 1994
INVENTOR(S) : Karl-Heing A. O. Starzewski It is certified that error appears in the above-indentified patent and that said Letters Patent is hereby corrected as shown below:

Column 4, line 12, "mixture or" should read --mixture of--.

Column 4, line 40, "ga" should read --gap--.

Signed and Sealed this

Seventh Day of March, 1995

Attest:

BRUCE LEHMAN

*Attesting Officer*  *Commissioner of Patents and Trademarks*